United States Patent [19]

Foucher et al.

[11] Patent Number: 5,604,066

[45] Date of Patent: Feb. 18, 1997

[54] TONER COMPOSITIONS WITH ORGANOMETALLIC POLYMERS

[75] Inventors: Daniel A. Foucher, Toronto; Guerino G. Sacripante, Oakville; Richard P. N. Veregin, Mississauga; Maria N. V. McDougall, Burlington, all of Canada

[73] Assignee: Xerox Corporation, Stamford, Conn.

[21] Appl. No.: 609,258

[22] Filed: Feb. 29, 1996

[51] Int. Cl.$^6$ ........................... G03G 9/087
[52] U.S. Cl. ............... 430/106; 430/106.6; 430/109; 430/110
[58] Field of Search ................ 430/106, 109, 430/110

[56] References Cited

U.S. PATENT DOCUMENTS

| | | | |
|---|---|---|---|
| 3,676,350 | 7/1972 | Wright et al. | 430/109 |
| 4,394,430 | 7/1983 | Jadwin et al. | 430/110 |
| 4,560,635 | 12/1985 | Hoffend et al. | 430/106.6 |
| 5,322,756 | 6/1994 | Ziolo | 430/109 |
| 5,384,224 | 1/1995 | Tanikawa et al. | 430/110 |

FOREIGN PATENT DOCUMENTS 5-267042  10/1993  Japan .

OTHER PUBLICATIONS

Encyclopedia of Polymer Science and Engineering, 2nd Edition, vol. 10, pp. 541 to 594 (1985), published by John Wiley & Sons.

*Primary Examiner*—Roland Martin
*Attorney, Agent, or Firm*—E. O. Palazzo

[57] ABSTRACT

A toner composition comprised of pigment, and a metallocene polymer. Also illustrated is a toner composition wherein the metallocene polymer is a metallocene polyester of the formula

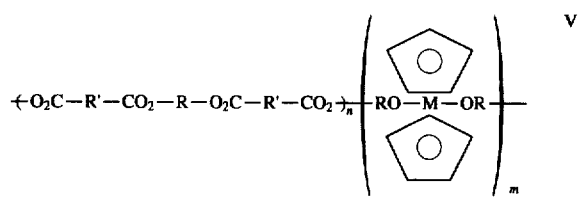

wherein R and R' are an alkylene or an arylene; M is the metal titanium; and wherein n and m represent the random segments of the polymer, and n is a number of from about 10 to about 1,000, and m is from about 1 to about 100.

28 Claims, No Drawings

TONER COMPOSITIONS WITH ORGANOMETALLIC POLYMERS

BACKGROUND OF THE INVENTION

This invention is generally directed to toner and developer compositions, and more specifically, the present invention is directed to developer and toner compositions comprised of an organometallic polymer, or a metallocene polymer wherein, for example, the metal is covalently bonded to the organic moiety, such as a ferrocenyl moiety present in the polymer backbone. In embodiments, there are provided in accordance with the present invention, toner compositions comprised, for example, of a metallocene polymer, carbon black, magnetites, or mixtures thereof, cyan, magenta, yellow, green, red or mixtures thereof, thereby providing for the development and generation of black and/or colored images. In embodiments, there are provided in accordance with the present invention thermoplastic polymers, such as styrene acrylates, styrene methacrylates, styrene butadienes, polyesters, polyamides, imide based resins, and other known toner resins, and wherein these polymers contain at least one metal containing moiety in an effective amount of from about 0.5 percent by weight to about 10 percent by weight of the polymer. The metals associated with an organic moiety are preferably a metal coordinated to an organic moiety, however, the metal may also be ionically or covalently bonded to the organic moiety, and wherein such metal includes, for example, iron, ruthenium, osmium, cobalt, rhodium, iridium, titanium and the like. The toners of the present invention in embodiments possess improved triboelectrification and excellent relative humidity stability characteristics. Also, the toner compositions of the present invention in embodiments can possess a number of other advantages such as exceptional nonvinyl resistance, low temperature fixing characteristics, such as from about 125° C. to about 145° C., and excellent temperature blocking characteristics, such as from about 55° C. to about 65° C.

In embodiments, the metal containing polymers of the present invention are comprised of resin containing therein, or more specifically in the resin backbone or as a pendant group, a coordinated metal, such as, for example, two cyclopentadienyl groups coordinated to a metal, such as iron (ferrocene) as illustrated by the formulas

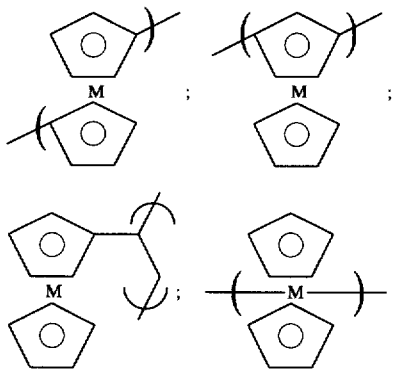

wherein M is iron (Fe), Co, Co+PF$_6$−, Os, Ru, Ti, Rh, Zr, Hf, Sn, Cr, and the like. The aforementioned moieties are generally referred to as a metallocenes.

Moreover, the organometallic polymers of the present invention can, in embodiments, be comprised of a resin with chemically bonded metallocene groups wherein at least one of the metallocene groups is comprised of a moiety containing a coordinated metal, and wherein the moiety is, for example, an aryl ring like a substituted cyclopentadiene or substituted benzene ring as illustrated by the formulas

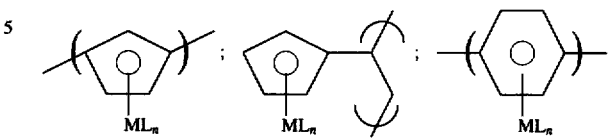

wherein M is Co, Mo, W, Rh, Ti, Cu, Ir, Cr, Sn, Zr, Fe, Ru, Os, Nb and the like; L is a ligand such as CO, NO, alkyl with, for example, from 1 to about 25 carbon atoms, such as methyl, ethyl, propyl, butyl, pentyl, hexy, octyl, decyl, trialkylphosphine, trialkylamine; and n is the number 1, 2, 3 or 4.

The resin composition of the present invention can in embodiments be generated by a process involving the melt condensation of about 1 mole equivalent of an organic diacid, an organic diester, or mixtures thereof, with at least 1 mole equivalent of an organic diol or mixtures of organic diols, provided that either or both diacid or diol component contain therein a metal containing monomer, such as dimethanol ferrocene, or ferrocene dicarboxylic acid and which is present in effective an amount of, for example, from about 0.01 to about 0.2 mole equivalent of the polymer resin. More specifically, the metal resin, such as a ferrocenepolyester, can be prepared, for example, by melt condensation by charging a reactor equipped with a mechanical stirrer and distillation apparatus with about 0.9 mole of a diester, such as dimethyl terephthalate, with about 0.1 mole of a metal containing moiety, such as 1,1'-ferrocene dicarboxylic acid, with about 2 moles of organic diol, such as 1,2-propanediol, and about 0.01 mole of catalyst, such as butylstannoic acid. The mixture is then heated to about 185° C. for a duration of from about 3 to about 6 hours whereby a mixture of methanol and water is collected in the distillation receiver. The reaction temperature is then raised from 185° C. to about 220° C., and maintained at 220° C. for a duration of from about 1 hour to about 6 hours under reduced pressure, whereby from about 0.8 mole to about 1 mole of the excess diol is collected in the distillation receiver. The product is then discharged from the reactor to yield, for example, the copoly(propylene-diethylene terephthalate)-copoly (1,3-dicarboxyl-ferrocene) resin.

Moreover, the resin composition of the present invention can in embodiments be generated by a process involving the anionic or free radical polymerization process of vinyl containing monomers such as styrene, isoprene, alkyl acrylates, alkyl methacrylates, butadiene mixtures thereof and a metal containing vinyl monomer, such as vinyl ferrocene, present in an effective amount of from about 0.1 to about 10 mole percent of the resin. The aforementioned metal containing polymers of the present invention in embodiments exhibit a number average molecular weight ($M_n$) of from about 1,500 to about 100,000 and a weight average molecular weight ($M_w$) of from about 3,000 to about 300,000 grams per mole as measured by gel permeation chromatography, and a glass transition temperature of from about 50° C. to about 65° C. as measured by the differential scanning calorimeter.

The toner compositions of the present invention in embodiments possess a number of advantages, including excellent relative humidity sensitivity, low melting characteristics, excellent blocking characteristics, excellent hot-offset temperatures, broad fusing latitudes, and nonvinyl offset properties.

A number of toner resins are known, such as styrene acrylates, styrene methacrylates, styrene butadiene, polyesters, polyamides, imide based resins, such as polyimides, polyester imides, polyimide imines, or polyamic acid, and the like. Metallocene or organometallic resins are illustrated in the *Encyclopedia of Polymer Science and Engineering*, 2nd Edition, Vol. 10, pages 541 to 594 (1985) published by John Wiley and Sons, the disclosure of which is totally incorporated herein by reference. Ferrocene containing polymers are disclosed in the aforementioned *Encyclopedia of Polymer Science and Engineering*, the disclosure of which is totally incorporated herein by reference. However, the use of organometallic containing polymers, especially ferrocene polymers, as a toner resin is not believed to be known.

In United Kingdom Patent Application GB 2 090 007, there is disclosed a light sensitive composition for a photorecording material, and wherein the photorecording material incorporates a ferrocene derivative and a halohydrocarbon. There is also disclosed in a Japanese Patent 5267042 an organic magnetic material for toners and ink comprised of a polymer derived from a ferrocene derivative and a benzene phosphonic acid ester. Other patent publications that may be of interest are Soviet Union 1029125, 1029124 and 1029123, wherein there is disclosed the use of ferrocene polymers in photomechanical processes.

SUMMARY OF THE INVENTION

Examples of objects of the present invention include:

It is an object of the present invention to provide toner and developer compositions with many of the advantages illustrated herein.

In another object of the present invention there are provided toner compositions with metal containing resins, and which toners are useful for the development of electrostatic latent images including color images.

In yet another object of the present invention there are provided toner resins, especially metal containing resins with a ferrocene moiety, and wherein the toners resulting possess excellent triboelectric charging characteristics, improved relative humidity stability, and the like.

Additionally, in another object of the present invention that are provided low melting toner compositions.

In another object of the present invention there are provided toners with low melt fusing temperatures of from about 120° C. to about 145° C., and a broad fusing latitude of from about 20° C. to about 60° C.

Further, it is an object of the present invention to provide toners which display low gloss, such as from about 0 to about 40 gloss units as measured by the Gardner Gloss metering unit, and excellent crease characteristics.

Moreover, it is an object of the present invention to provide a toner, which displays low relative sensitivity, such as from about 1.0 to about 2.9 as measured from the triboelectric charge ratio at the 20 percent humidity level and 80 percent humidity level.

Another object of the present invention resides in the formation of toners which will enable the development of images in electrophotographic imaging and printing apparatuses, which images have substantially no background deposits thereon, are substantially smudge proof or smudge resistant, and, therefore, are of excellent resolution; and further, such toner compositions can be selected for high speed electrophotographic apparatuses, that is those exceeding 70 copies per minute.

In another object of the present invention there are provided toner compositions comprised of pigment, optional known additives, such as charge additives, waxes, and surface additives, and certain metal containing a thermoplastic polymer, or thermoplastic polymers, and wherein the metal is chemically bonded, or chemically attached to the polymer chain, and more specifically, wherein the polymer is a polyester derived from terephthalate (DMT), diethylene glycol, and 1,2-propanediol having incorporated therein and bonded thereto a ferrocene dicarboxylic acid in an effective amount of, for example, 0.15 mol percent.

These and other objects of the present invention can be accomplished in embodiments thereof by providing toner compositions comprised of metallocene containing thermoplastic resins, and preferably polymers having incorporated therein a ferrocene moiety, and pigment particles. Polymer resins with small effective amounts of a metallocene, and preferably ferrocene, such as from about 0.25 to about 20 weight percent, and preferably from about 0.5 to about 10 weight percent based on the total weight percent of the polymer, can be selected in embodiments of the present invention. The metal containing polymers are preferably ferrocene-polyesters, however, other metal containing polymers wherein the base resin is a polyamide, a polyimide, a polystyrene-acrylate, a polystyrene-methacrylate, polystyrene-butadiene and the like can be selected.

Embodiments of the present invention include a toner composition wherein the metallocene polymer is a metallocene polyester of the formulas

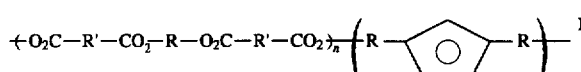
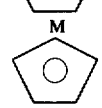

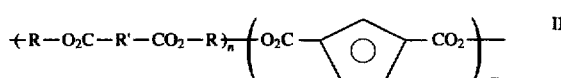
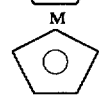

wherein R and R' are preferably an alkylene of from about 2 to about 20 carbon atoms, such as ethylene, propylene, butylene, pentylene, hexylene and the like, however, R' and R may be other suitable groups in embodiments providing that the valence bonding is appropriate, or an arylene of from about 6 to about 30 carbon atoms such as benzylene, anthracenylene, biphenylene, and the like; M is the metal iron, cobalt, ruthenium, osmium, and wherein n and m represent random segments of the polymer, and wherein n is, for example, from about 10 to about 1,000, and m is, for example, from about 1 to about 100; and wherein said polymer possesses a number average molecular weight of from about 3,000 to about 50,000 grams per mole, a weight average molecular weight of from about 6,000 to about 150,000 grams per mole, and a polydispersity of from about 2 to about 18; a toner composition wherein the metallocene polymer is a metallocene polyester of the formulas

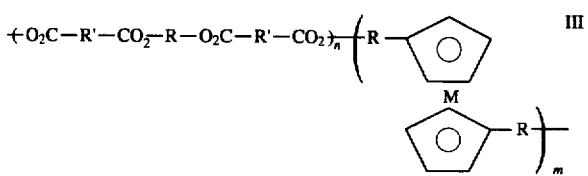

III

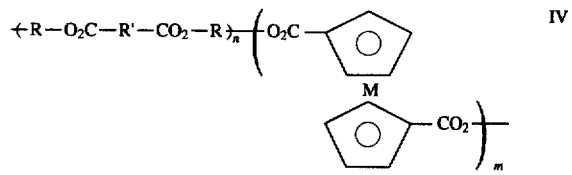

IV wherein R and R' are an alkylene or arylene as illustrated herein; M is the metal iron, cobalt, or ruthenium; and wherein n and m represent the number of random segments of the polymer, and wherein n is from about 10 to about 1,000, and m is from about 1 to about 100; and p is an integer of 1, 2, 3 or 4, and wherein p is equal to the valency, such as 0, 1,2, 3 or 4 of the metal; a toner composition wherein the metallocene polymer is a metallocene polyester of the formula

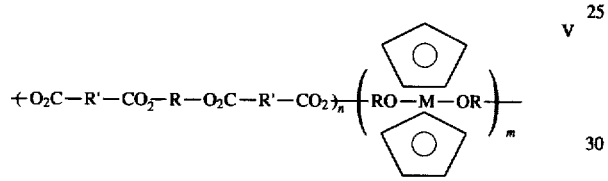

V wherein R and R' are an alkylene or arylene as illustrated herein; M is the metal titanium; and wherein n and m represent the number of random segments of the polymer, and n is a number of from about 10 to about 1,000, and m is a number of from about 1 to about 100; a toner composition wherein the metallocene polymer is a metal containing polyester of the formulas

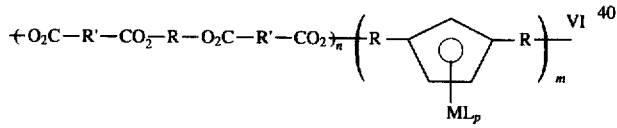

VI

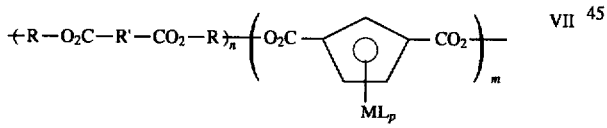

VII wherein R and R' are an alkylene of from about 2 to about 30 carbon atoms, or arylene of from about 6 to about 30 carbon atoms; M is the metal dicarbonyl cobalt, rhodium, tungsten, iridium, or copper; L is the ligand carbonyl, nitroxide, or alkylphosphine; and p is an integer of 2, 3 or 4; and wherein n and m represent the number of random segments, and n is from about 10 to about 1,000, and m is from about 1 to about 100; a toner composition wherein the metallocene polymer is a metal containing polyester of the formulas

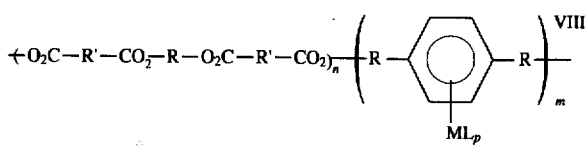

VIII

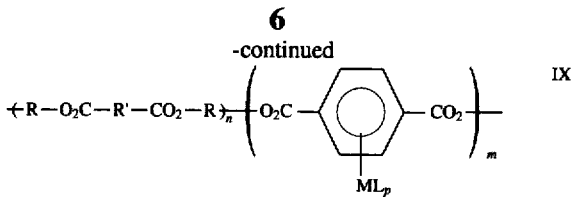

IX wherein R and R' are an alkylene or arylene as illustrated herein; M is the metal dicarbonyl cobalt, rhodium, tungsten, iridium, copper; L is a ligand of carbonyl, nitroxide, or alkylphosphine; and p is an integer of 2, 3 or 4; and wherein n and m represent the number of random segments, and n is from about 10 to about 1,000, and m is from about 1 to about 100; a toner composition wherein the metallocene polymer is an addition type polymer of the formulas

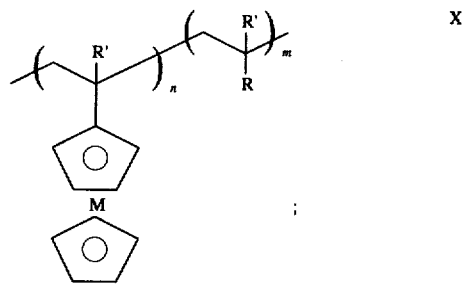

X

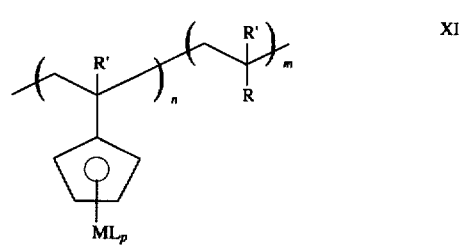

XI wherein R is hydrogen or an alkyl group of from about 1 to about 25 carbon atoms; R' is styryl, alkyl acrylate, or methacrylate group; M is the metal dicarbonyl cobalt, rhodium, tungsten, iridium, or copper; L is a ligand of carbonyl, nitroxide, or alkylphosphine; and p is an integer of 2, 3 or 4; and wherein n and m represent the number of random segments, and n is from about 10 to about 1,000, and m is from about 1 to about 100; and a toner composition wherein the polymer is an addition type polymer of the formula

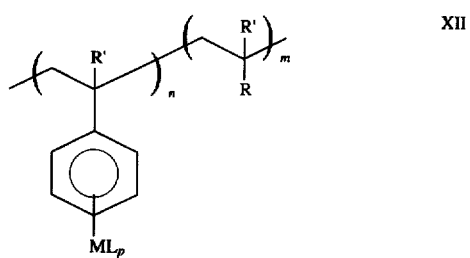

XII wherein R is hydrogen or an alkyl group; R' is styryl, alkyl acrylate, alkyl methacrylate group; M is the metal cobalt, rhodium, tungsten, iridium, or copper; L is a ligand of carbonyl, nitroxide, or alkylphosphine; and p is an integer of 2, 3 or 4; and wherein n and m represent random segments, and n is from about 10 to about 1,000, and m is from about 1 to about 100. The toner compositions contain pigment, or a mixture of pigments, and optionally other known additives.

Specific examples of ferrocene polyesters that may be selected as the toner resin include copoly(propylene-diethylene-terephthalate)copoly (1, 1'-dicarboxyl-ferrocene), copoly(diethylene-terephthalate)copoly-(1,1'-dicarboxyl-ferrocene), copoly(propylene-terephthalate)copoly(1,1'-dicarboxyl-ferrocene), copoly(neopentylene-terephthalate)copoly(1,1'-dicarboxyl-ferrocene), copoly(neopentylene-diethylene terephthalate)-copoly(1,1'-dicarboxyl-ferrocene), copoly(neopentylenepropylene terephthalate)-copoly(1,1'-dicarboxyl-ferrocene), copoly(propylene-diethylene-terephthalate-5-sulfoisophthalate sodium salt)-copoly(1,1'-dicarboxyl-ferrocene), and the like.

Specific examples of metallocene polyesters that may be selected as the toner resin include cobalt acenium polyester such as copoly(propylene-diethylene-terephthalate )-copoly(1,1'-dicarboxyl-cobalt acenium), copoly(diethylene-terephthalate)-copoly(1,1'-dicarboxyl-cobalt acenium), copoly(propylene-terephthalate)-copoly(1,1'-dicarboxyl-cobalt acenium); ruthenocene polyesters such as copoly(propylene-diethylene-terephthalate) -copoly(1,1'-dicarboxyl-ruthenocene), copoly(diethylene-terephthalate)-copoly(1,1'-dicarboxyl-ruthenocene), copoly(propylene-terephthalate)-copoly (1,1'-dicarboxyl-ruthenocene); and osmocene polyesters such as copoly(propylene-diethylene-terephthalate)-copoly(1,1'-dicarboxyl -osmocene), copoly(diethylene-terephthalate)-copoly(1,1'-dicarboxyl-osmocene), copoly(propylene-terephthalate)-copoly(1,1'-dicarboxyl -osmocene), and the like.

Specific examples of metallocene vinyl polymers and copolymers that may be selected as the toner resin include polyvinyl ferrocene, copoly(styrene-butadiene)-copoly(vinyl ferrocene), copoly(styrene-acrylate) -copoly(vinyl ferrocene), copoly(styrene-methacrylate)-copoly(vinyl ferrocene), copoly(styrene-isoprene)-copoly(vinyl ferrocene), polyvinylruthenocene, copoly(styrene-butadiene)-copoly(vinylruthenocene), copoly(styrene-acrylate)copoly-(vinylruthenocene), copoly(styrene-methacrylate)copoly(vinylruthenocene), polyvinyl-(cobalt acenium), copoly(styrene-butadiene) -copoly(vinylcobalt acenium), copoly(styrene-acrylate)-copoly(vinylcobalt acenium), copoly(styrene-methacrylate)-copoly(vinylcobalt acenium), and the like.

Specific examples of metal containing monomers that can be utilized for preparing the metal containing polymer include 1,1'-ferrocene dicarboxylic acid, 1,1'-ferrocene dimethanol, dimethyl 1,1'-ferrocene dicarboxylate, 1,1'-bis(hydroxyethyl)ferrocene, 1,1'-bis(aminoethyl)ferrocene, 1,1'-ferrocene diboronic acid, 1,1'-ruthenocene dicarboxylic acid, 1,1'-cobalt acenium($PF_6$-)dicarboxylic acid, titanocene dichloride, zirconocene dichloride, hafnocene dichloride, 1,1'-bis(benzene)chromium($PF_6$-)dicarboxylic acid, 1,1'-bis(benzene) molybdenum dicarboxylic acid, 1,6-chromiumtricarbonyl dicarboxylic acid, 1,6-benzene(tricarbonyl)chromium dimethanol, 1,6-benzene(tricarbonyl)chromium dimethoxy, 1,6-benzene(tricarbonyl)chromium dihydroxyethyl, 1,6-molybdenumtricarbonyl dicarboxylic acid, 1,6-benzene(tricarbonyl) molybdenum dimethanol, 1,6-benzene(tricarbonyl)molybdenum dimethoxy, 1,6-benzene(tricarbonyl)molybdenum dihydroxyethyl, derivatives with other metals such as scandium, yttrium, lutetium, titanium, zirconium, hafnium, vanadium, niobium, tantalum, chromium, molybdenum, tungsten, manganese, rhenium, iron, rubidium, osmium, cobalt, rhodium, iridium, copper, paladium, zinc, cadmium, tin, antimony, or thalium. The aforementioned resins are selected for the toner in various effective amounts such as, for example, from about 70 to about 95 and preferably from about 80 to about 91 weight percent, thus when 8 weight percent of pigment is selected, 92 weight percent of metal containing resin is selected.

Specific examples of diols utilized in preparing the aforementioned metal containing polyesters include ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, 1,2-hexylene glycol, 1,3-hexylene glycol, 1,4-hexylene glycol, 1,5-hexylene glycol, 1,6-hexylene glycol, heptylene glycol, octylene glycol, decylene glycol, dodecylene glycol, 2,2-dimethyl propanediol, propoxylated bisphenol A, ethoxylated bisphenol A, 1,4-cyclohexane diol, 1,3-cyclohexane diol, 1,2-ocyclohexane diol, 1,2-cyclohexane dimethanol, 2-propanediol, mixtures thereof, and the like; and which glycols are selected in various effective amounts such as, for example, from about 40 to about 60 weight percent by weight of the product resin, such as the polyester product resin.

Specific examples of diacids or diesters utilized in preparing the aforementioned metal containing polyesters or polyamides include malonic acid, succinic acid, 2-methyl succinic acid, 2,3-dimethylsuccinic acid, dodecyl succinic acid, glutaric acid, adipic acid, 2-methyladipic acid, pimelic acid, azeilic acid, sebacic acid, terephthalic acid, isophthalic acid, phthalic acid, 1,2-cyclohexanedioic acid, 1,3-cyclohexanedioic acid, 1,4-cyclohexanedioic acid, glutaric anhydride, succinic anhydride, dodecyl succinic anhydride, maleic anhydride, fumaric acid, maleic acid, itaconic acid, 2-methylitaconic acid, dialkyl esters, wherein alkyl groups contain from about 1 to about 23 carbon chains, and are esters of malonate, succinate, 2-methylsuccinate, 2,3-dimethylsuccinate, dodecylsuccinate, glutarate, adipic acid, 2-methyladipate, pimelate, azeilate, sebacate acid, terephthalate, isophthalate, phthalate, 1,2-cyclohexanedioate, 1,3-cyclohexanedioate, 1,4-cyclohexanedioate, mixtures thereof, and which component is employed in effective amounts of, for example, from about 40 to about 60 percent by weight of the resin.

Specific examples of tetraacid or dianhydride monomers that can be utilized to prepare the metal containing imide resins of the present invention include 5-(2,5-dioxotetrahydrol)-3-methyl-3-cyclohexene-1,2-dicarboxylic anhydride, or the 5-(2,5-dioxotetrahydrol)-4-methyl-3-cyclohexene -1,2-dicarboxylic anhydride, available as B-4400 and B-5060, respectively, from Dai Nippon Ink Chemical Company, pyromellitic dianhydride, pyromellitic tetraacid, ethylenediamine dianhydride, benzophenone dianhydride, 3,3, 4,4'-biphenyl tetracarboxylic dianhydride, 2,2'-bis-(3,4-dicarboxyphenyl) hexafluoropropane dianhydride, 4,4'-oxydiphthalic anhydride, 3,3',4,4'-diphenylsulfone tetracarboxylic dianhydride, 3,3,4,4'-benzophenone tetracarboxylic dianhydride, also known as benzophenone dianhydride, 3,3',4,4'-biphenyl tetracarboxylic dianhydride, 2,2'-bis-(3,4-dicarboxyphenyl) hexafluoropropane dianhydride, 4,4'-oxydiphthalic anhydride, 3,3',4,4'-diphenylsulfone tetracarboxylic dianhydride, 1,2,3,4-cyclopentane tetraacid dianhydride, 1,2,4-trimellitic acid anhydride, 1,2,3-trimellitic acid, 1,2,3ocyclohexanetricarboxylic acid, 1,2,4-cyclohexanetricarboxylic acid, 2,5,7-naphthalenetricarboxylic acid, 1,2,4-butanetricarboxylic acid, mixtures thereof, and the like. These monomers are selected in various effective amounts, such as from about 0.45 mole equivalent to about 0.55 mole equivalent of the resin.

Specific examples of diamino alkanes or diamino alkylene oxides that can be utilized to prepare the metal containing polyamide, or imide based resins include diaminoethane, diaminopropane, 2,3-diaminopropane, diaminobutane, diaminopentane, diamino-2-methylpentane, also known as DYTEK A™ available from DuPont Chemical Company, diaminohexane, diamino-trimethylhexane, diaminoheptane, diaminooctane, diaminononane, diaminodecane, diaminododecane, diaminoterminated-ethylene oxide, diaminoterminated-diethylene oxide, available as JEFFAMINE EDR-148™ from Texaco Chemicals, diaminoterminated-triethylene oxide, available as JEFFAMINE EDR-192™ from Texaco Chemicals, diaminoterminated-polyoxypropylene oxide, available from Texaco Chemicals as JEFFAMINE D-230™, JEFFAMINE 400™, JEFFAMINE 700™, mixtures thereof, and the like. This component is selected in various effective amounts such as from about 0.45 mole equivalent to about 0.55 mole equivalent of the resin.

Specific examples of vinyl monomers that can be utilized in preparing free-radical polymers can be selected from the group consisting of styrene, butadiene, isoprene, piperylene, methyl acrylate, ethyl acrylate, propyl acrylate, butyl acrylate, hexyl acrylate, lauryl acrylate, stearyl acrylate, methyl methacrylate, ethyl methacrylate, propyl methacrylate, butyl methacrylate, hexyl methacrylate, lauryl methacrylate, mixtures thereof and the like, and are selected in various effective amounts, such as from about 0.8 mole equivalent to about 0.95 mole equivalent of the resin.

Specific examples of metals containing vinyl monomers can be selected from the group comprised of vinylferrocene, vinylruthenocene, vinylosmocene, vinylscandium, vinylyttrium, vinyllutetium, vinyltitanium, vinylzirconium, vinylchromium, vinylmolybdenum, tungsten, vinylcobalt, vinylrhodium, vinyliridium, and the like, and are selected in an effective amount of from about 0.05 mole equivalent to about 0.20 mole equivalent of the resin.

Specific examples of metals ranging from its zero to its sixth oxidation state that can be utilized in generating the metal containing polymers can be selected from the group consisting of scandium, yttrium, lutetium, titanium, zirconium, hafnium, vanadium, niobium, tantalum, chromium, molybdenum, tungsten, manganese, rhenium, iron, rubidium, osmium, cobalt, rhodium, iridium, copper, paladium, zinc, cadmium, tin, antimony, thalium, mixtures thereof, and the like, and are selected in an effective amount of from about 5 weight percent to about 20 weight percent of the resin.

Specific examples of ligands which are present with the metals of this invention can be selected from the group comprised of carbonyl, nitroxide, trialkylphosphine, trialkylammonium, pentafluorophosphorous, mixtures thereof, and the like; and wherein the alkyl groups are methyl, ethyl, propyl, butyl, pentyl, hexyl, heptyl, octyl, nonyl, decyl, dodecyl, stearyl, and the like.

Specific examples of polycondensation catalysts can include tetraalkyl titanates, dialkyltin oxide, tetraalkyltin, dialkyltin oxide hydroxide, aluminum alkoxides, alkyl zinc, dialkyl zinc, zinc oxide, stannous oxide, dibutyltin oxide, butyltin oxide hydroxide, tetraalkyl tin, such as dibutyltin dilaurate, and mixtures thereof; and which catalysts are selected in effective amounts of from about 0.001 mole equivalent to about 0.1 mole equivalent of the resin.

Embodiments of the present invention include a toner composition comprised of pigment, and a polymer resin containing from about 1 weight percent to about 20 weight percent of metallocene, and wherein the polymer resin is a thermoplastic; or more specifically, wherein the polymer is a metallocene, especially ferrocene containing polyester, polyimide, polyester imide, polyimide imine, polyamic acid, a polystyrene, a polystyrene-acrylate, a polystyrene-methacrylate, or a polystyrene butadiene. Moreover, in embodiments resins, such as styrene methacrylates, styrene acrylates, styrene butadienes, and the like, with a ferrocene moiety can be selected for the toner compositions illustrated herein.

Various known colorants present in the toner in an effective amount of, for example, from about 1 to about 25 percent by weight of toner, and preferably in an amount of from about 1 to about 10 weight percent, that can be selected include carbon black like REGAL 330® magnetites, such as Mobay magnetites MO8029™, MO8060™; Columbian magnetites; MAPICO BLACKS™ and surface treated magnetites; Pfizer magnetites, CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and other equivalent black pigments. As colored pigments there can be selected known cyan, magenta, yellow, red, green, brown, blue or mixtures thereof. Specific examples of pigments include HELIOGEN BLUE L6900™, D6840™, D7080™, D7020™, PYLAM OIL BLUE™ and PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAperm YELLOW FGL™, HOSTAPERM PINK E™ from Hoechst, and CINQUASIA MAGENTA™ available from E.I. DuPont de Nemours & Company, and the like, reference for example with respect to the Color Index numbers for the above pigments, the Color Index, the disclosure of which is totally incorporated herein by reference. Generally, colored pigments that can be selected are cyan, magenta, or yellow pigments, and mixtures thereof. Examples of magenta materials that may be selected as pigments include, for example, 2,9-dimethyl-substituted quinacridone and anthraquinone dye identified in the Color Index as Cl 60710, Cl Dispersed Red 15, diazo dye identified in the Color Index as Cl 26050, Cl Solvent Red 19, and the like. Illustrative examples of cyan materials that may be used as pigments include copper tetra-(octadecyl sulfonamido) phthalocyanine, x-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™ and colored pigments like cyan may also be selected as pigments. The toner pigment is selected in effective amounts of from, for example, about 1 weight percent to about 50, and preferably from about 5 to about 20 weight percent of the toner components of, for example, metal containing resin and pigment.

The toner may also include known charge additives, such as alkyl pyridinium halides, bisulfates, the charge control additives of U.S. Pat. Nos. 3,944,493; 4,007,293; 4,079,014; 4,394,430 and 4,560,635, which illustrates a toner with a distearyl dimethyl ammonium methyl sulfate charge additive, the disclosures of which are totally incorporated herein by reference, negative charge additives like aluminum complexes, such as BONTRON E-88™, available from Orient Chemicals, and the like. Also, mixtures of charge additives, such as distearyl dimethyl ammonium methyl sulfate (DDAMS) and distearyl dimethyl ammonium bisulfate, which mixture preferably contains about 50 percent of each charge additive, can be selected.

Surface additives that can be added to the toner compositions of the present invention include, for example, metal salts, metal salts of fatty acids, colloidal silicas, tin oxides, titanium oxides, mixtures thereof, and the like, which additives are usually present in an amount of from about 0.1 to about 1 weight percent, reference for example U.S. Pat. Nos. 3,590,000; 3,720,617; 3,655,374 and 3,983,045, the disclosures of which are totally incorporated herein by reference. Preferred additives include zinc stearate and the fumed silica AEROSIL R972®available from Degussa Chemicals. Also, waxes, such as polypropylene and polyethylene, can be added to the toner in amounts of, for example, from about 0.1 to about 3 weight percent.

In embodiments of the present invention there are provided, subsequent to known micronization and classification, toner with an average volume diameter of from about 5 to about 20 microns comprised of polyimide resin and pigment particles, and optional charge enhancing additives.

The ferrocene containing resin is present in the toner a sufficient, but effective amount, for example from about 70 to about 95 weight percent. Thus, when 1 percent by weight of a charge enhancing additive is present, and 10 percent by weight of pigment or colorant, such as carbon black, is contained therein, about 89 percent by weight of resin is selected. Also, the charge enhancing additive may be coated on the pigment particles.

The toner and developer compositions of the present invention may be selected for use in electrostatographic imaging apparatuses containing therein known photoreceptors. Thus, the toner and developer compositions of the present invention can be used with layered photoreceptors, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

Developer compositions include carrier particles, and the metal containing toners illustrated herein, examples of carriers being steel, iron, ferrites, silicon oxides, and the like, coated or uncoated, reference for example U.S. Pat. Nos. 4,937,166 and 4,935,326, the disclosures of which are totally incorporated herein by reference.

The following Examples are being provided to further define various species of the present invention, and these Examples are intended to illustrate and not limit the scope of the present invention. Parts and percentages are by weight unless otherwise indicated.

EXAMPLE

A ferrocene-polyester resin derived from 0.475 mole of dimethylterephthalate, 0.025 mole of 1,1'-ferrocenedicarboxylic acid, 0.425 mole of 1,2-propanediol, 0.075 mole of diethylene glycol, and 0.03 mole of trimethylolpropane was prepared as follows.

In a one liter Parr reactor equipped with a bottom drain valve, double turbine agitator, and distillation receiver with a cold water condenser were charged 388 grams of dimethylterephthalate, 266 grams of 1,2-propanediol (1 mole excess), 52.5 grams of diethylene glycol, 2.75 grams of 1,1'-ferrocenedicarboxylic acid, 16.2 grams of trimethylolpropane, and 0.8 gram of tetrabutyl titanate as the catalyst. The reactor was then heated to 165° C. with stirring for 16 hours whereby 115 grams of distillate was collected in the distillation receiver, and which distillate was comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced from atmospheric pressure to about 260 Torr over a one hour period, and then reduced to 5 Torr over a two hour period with collection of approximately 122 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer product discharged through the bottom drain onto a container cooled with dry ice to yield 460 grams of ferrocene-polyester resin. The ferrocene-polyester resin, copoly(1,2-propylene-diethylene)terephthalate-copoly (1,1'-ferrocene dicarboxylate), product softening point was 122° C., the $M_n$ was 5,000, and the $M_w$ was 17,500. The resin glass transition temperature was then measured to be 50° C. (onset) utilizing the 910 Differential Scanning Calorimeter available from E.I. DuPont operating at a heating rate of 10° C. per minute. The number average molecular weight was measured to be 5,000 grams per mole, and the weight average molecular weight was measured to be 17,500 grams per mole using tetrahydrofuran as the solvent. The $M_w$ and $M_n$ were determined with the 700 Satelite WISP gel permeation chromatograph, available from Waters Company, and equipped with a styrogel column.

EXAMPLE II

A ferrocene-polyester resin derived from 0.475 mole of dimethylterephthalate, 0.05 mole of 1,1'-ferrocenedicarboxylic acid, 0.425 mole of a 1,2-propanediol, 0.075 mole of diethylene glycol, and 0.03 mole of trimethylolpropane was prepared as follows.

In a one liter Parr reactor equipped with a bottom drain valve, double turbine agitator, and distillation receiver with a cold water condenser were charged 388 grams of dimethylterephthalate, 266 grams of 1,2-propanediol (1 mole excess), 52.5 grams of diethylene glycol, 5.0 grams of 1,1'-ferrocenedicarboxylic acid, 16.2 grams of trimethylolpropane and 0.8 gram of tetrabutyl titanate as the catalyst. The reactor was then heated to 165° C. with stirring for 16 hours whereby 115 grams of distillate were collected in the distillation receiver, and which distillate was comprised of about 98 percent by volume of methanol and 2 percent by volume of 1,2-propanediol as measured by the ABI3E refractometer available from American Optical Corporation. The mixture was then heated to 190° C. over a one hour period, after which the pressure was slowly reduced from atmospheric pressure to about 260 Torr over a one hour period, and then reduced to 5 Torr over a two hour period with the collection of approximately 122 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer discharged through the bottom drain onto a container cooled with dry ice to yield 460 grams of the ferrocene-polyester resin, copoly( 1,2-propylene-diethylene) terephthalate-copoly(1,1'-ferrocene dicarboxylate). The ferrocene-polyester resin softening point was 122° C., and the resin glass transition temperature was then measured to be 56° C. (onset) utilizing the 910 Differential Scanning Calorimeter available from E.I. DuPont operating at a heating rate of 10° C. per minute. The number average molecular weight was measured in accordance with Example I to be 4,000 grams per mole, and the weight average molecular weight was measured to be 21,500 grams per mole using tetrahydrofuran as the solvent.

EXAMPLE II

A ferrocene-containing polyester resin derived from 0.475 mole of dimethylterephthalate, 0.05 mole of 1,3-ferrocene dicarboxylic acid, 0.425 mole of a 1,2-propanediol, 0.075 mole of diethylene glycol, and 0.03 mole of trimethylolpropane was prepared as follows.

In a one liter Parr reactor equipped with a bottom drain valve, double turbine agitator, and distillation receiver with a cold water condenser were charged 388 grams of dimethylterephthalate, 266 grams of 1,2-propanediol (1 mole excess), 52.5 grams of diethylene glycol, 5.0 grams of 1,3-ferrocene dicarboxylic acid, 16.2 grams of trimethylolpropane and 0.8 gram of tetrabutyl titanate as the catalyst. The reactor was heated to 165° C. with stirring for 16 hours whereby 115 grams of distillate were collected in the distillation receiver, and which distillate contained about 98 percent by volume of methanol and 2 percent by volume of 1,2-propanediol as measured by the ABBE refractometer available from American Optical Corporation. The reactor mixture was then heated to 190° C. over a one hour period, after which the pressure was slowly reduced from atmospheric pressure to about 260 Torr over a one hour period, and then reduced to 5 Torr over a two hour period with the collection of approximately 122 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer product was discharged through the bottom drain onto a container cooled with dry ice to yield 460 grams of the ferrocene-polyester resin, copoly(1,2-propylene diethylene)terephthalate-copoly(1,1'-ferrocene dicarboxylate). The resin glass transition temperature was then measured to be between 46° to 60° C. (onset) utilizing the 910 Differential Scanning Calorimeter available from E.I. DuPont operating at a heating rate of 10° C. per minute. The number average and weight average molecular weights were then measured to be between 3,000 to 5,000 grams per mole and 17,000 to 21,500 grams per mole, respectively, using tetrahydrofuran as the solvent, and using the 700 Satelite WiSP gel permeation chromatograph, available from Waters Company, and equipped with a styrogel column.

EXAMPLE IV

A ferrocene-containing polyamide resin derived from 0.475 mole of dimethylterephthalate, of 0.05 mole of 1,1'-ferrocenedicarboxylic acid, and 0.5 mole diamino-terminated poly(oxyethylene) available as JEFFAMINE EDR-192™ was prepared as follows.

In a one liter Parr reactor equipped with a bottom drain valve, double turbine agitator, and distillation receiver with a cold water condenser were charged 388 grams of dimethylterephthalate, 5.0 grams of 1,1'-ferrocenedicarboxylic acid, 384 grams of JEFFAMINE EDR-192™, available from Huls Chemicals, and 0.8 gram of tetrabutyl titanate as the catalyst. The reactor was then heated to 165° C. with stirring for 16 hours whereby water was collected in the distillation receiver. The mixture was then heated to 190° C. over a one hour period, after which the pressure was slowly reduced from atmospheric pressure to about 260 Torr over a one hour period, and then reduced to 5 Torr over a two hour period whereby water was collected. The reactor contents were then purged with nitrogen to atmospheric pressure, and the polymer discharged through the bottom drain onto a container cooled with dry ice to yield 520 grams of the ferrocene-polyamide resin, copoly(oxyethyl)terephthalamide-copoly(1,1'-ferrocene dicarboxylamide). The resin glass transition temperature was then measured to be 53° C. (onset) utilizing the 910 Differential Scanning Calorimeter available from E.I. DuPont operating at a heating rate of 10° C. per minute.

EXAMPLE V

A ferrocene-containing polyester resin derived from 0.475 mole of dimethylterephthalate, 0.05 mole of 1,1'-ferrocene dimethanol, 0.425 mole of a 1,2-propanediol, 0.075 mole of diethylene glycol, and 0.03 mole of trimethylolpropane was prepared as follows.

In a one liter Parr reactor equipped with a bottom drain valve, double turbine agitator, and distillation receiver with a cold water condenser were charged 388 grams of dimethylterephthalate, 266 grams of 1,2-propanediol (1 mole excess), 52.5 grams of diethylene glycol, 5.0 grams of 1,1'-ferrocene dimethanol, 16.2 grams of trimethylolpropane and 0.8 gram of tetrabutyl titanate as the catalyst. The reactor was heated to 165° C. with stirring for 16 hours whereby 115 grams of distillate were collected in the distillation receiver and which distillate contained about 98 percent by volume of methanol and 2 percent by volume of 1,2-propanediol as measured by the ABBE refractometer available from American Optical Corporation. The reaction mixture was then heated to 190° C. over a one hour period, after which the pressure was slowly reduced from atmospheric pressure to about 260 Torr over a one hour period, and then reduced to 5 Torr over a two hour period with collection of approximately 122 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer discharged through the bottom drain onto a container cooled with dry ice to yield 460 grams of the ferrocene-polyester resin, copoly(1,2-propylene-diethylene) terephthalate-copoly(1,1'-ferrocene dimethanol-terephthalate). The resin glass transition temperature was then measured to between 46° C. to 56° C. (onset) utilizing the 910 Differential Scanning Calorimeter available from E.I. DuPont operating at a heating rate of 10° C. per minute. The number average and weight average molecular weights were then measured to be between 3,000 to 5,000 grams per mole and 17,000 to 21,500 grams per mole, respectively, using tetrahydrofuran as the solvent, and using the 700 Satelite WISP gel permeation chromatograph, available from Waters Company, and equipped with a styrogel column.

EXAMPLE VI

A ferrocene-containing polyester resin derived from 0.475 mole of dimethylterephthalate, 0.05 mole of 1,3-ferrocene dimethanol, 0.425 mole of a 1,2-propanediol, 0.075 mole of diethylene glycol and 0.03 mol of trimethylolpropane was prepared as follows.

In a one liter Parr reactor equipped with a bottom drain valve, double turbine agitator, and distillation receiver with a cold water condenser were charged 388 grams of dimethylterephthalate, 266 grams of 1,2-propanediol (1 mole excess), 52.5 grams of diethylene glycol, 5.0 grams of 1,3-ferrocene dimethanol, 16.2 grams of trimethyolpropane and 0.8 gram of tetrabutyl titanate as the catalyst. The reactor was heated to 165° C. with stirring for 16 hours whereby 115 grams of distillate were collected in the distillation receiver comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced from atmospheric pressure to about 260 Torr over a one hour period, and then reduced to 5 Torr over a two hour period with collection of approximately 122 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer discharged through the bottom drain onto a container cooled with dry ice to yield 460 grams of the ferrocene-polyester resin, copoly(1,2-propylene-diethylene-)terephthalate-copoly (1,1'-ferrocene dimethanol-terephthalate). The resin glass transition temperature was then measured to be 56° C. (onset) utilizing the 910 Differential Scanning Calorimeter available from E.I. DuPont operating at a heating rate of 10° C. per minute. The number average and weight average molecular weights were then measured to be between 3,000 to 5,000 grams per mole and 17,000 to 21,500 grams per mole, respectively, using tetrahydrofuran as the solvent, and using the 700 Satelite WISP gel permeation chromatograph, available from Waters Company, and equipped with a styrogel column.

EXAMPLE VII

A titanocene-containing polyester resin derived from 0.475 mole of dimethylterephthalate, 0.05 mole of titanocene dichloride, and 0.425 mole of a 1,2-propanediol and 0.075 mole of diethylene glycol was prepared as follows.

In a one liter Parr reactor equipped with a bottom drain valve, double turbine agitator, and distillation receiver with a cold water condenser were charged 388 grams of dimethylterephthalate, 266 grams of 1,2-propanediol (1 mole excess), 52.5 grams of diethylene glycol, 5.0 grams of titanocene dichloride, and 0.8 gram of tetrabutyl titanate as the catalyst. The reactor was heated to 165° C. with stirring for 16 hours whereby 115 grams of distillate were collected in the distillation receiver comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced from atmospheric pressure to about 260 Torr over a one hour period, and then reduced to 5 Torr over a two hour period with collection of approximately 122 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer product was discharged through the bottom drain onto a container cooled with dry ice to yield 460 grams of a titanocene-polyester resin product, copoly( 1,2-propylene-diethylene)terephthalate-copoly(titanocenyl-terephthalate). The resin glass transition temperature was then measured to be 56° C. (onset) utilizing the 910 Differential Scanning Calorimeter available from E.I. DuPont operating at a heating rate of 10° C. per minute. The number average molecular weight was measured to be 4,000 grams per mole, and the weight average molecular weight was measured to be 21,500 grams per mole using tetrahydrofuran as the solvent, and using the 700 Satelite WISP gel permeation chromatograph, available from Waters Company, and equipped with a styrogel column.

EXAMPLE VIII

A cyclopentadienyl manganese tricarbonyl-containing polyester resin derived from 0.475 mole of dimethylterephthalate, 0.05 mole of 1,3-cyclopentadienyl manganese tricarbonyl dicarboxylate, and 0.425 mole of a 1,2-propanediol, and 0.075 mole of diethylene glycol is prepared as follows.

In a one liter Parr reactor equipped with a bottom drain valve, double turbine agitator, and distillation receiver with a cold water condenser were charged 388 grams of dimethylterephthalate, 266 grams of 1,2-propanediol (1 mole excess), 52.5 grams of diethylene glycol, 5.0 grams of 1,3 -cyclopentadienyl manganese tricarbonyl dicarboxylate, and 0.8 gram of tetrabutyl titanate as the catalyst. The reactor was heated to 165° C. with stirring for 16 hours whereby 115 grams of distillate were collected in the distillation receiver comprised of about 98 percent by volume of methanol and 2 percent by volume of 1,2-propanediol as measured by the ABBE refractometer available from American Optical Corporation. The reactor mixture was then heated to 190° C. over a one hour period, after which the pressure was slowly reduced from atmospheric pressure to about 260 Torr over a one hour period, and then reduced to 5 Torr over a two hour period with collection of approximately 122 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer discharged through the bottom drain onto a container cooled with dry ice to yield 460 grams of a cyclopentadienyl manganese tricarbonyl-polyester resin, copoly(1,2-propylene-diethylene) terephthalate-copoly(1,3-cyclopentadienyl manganese tricarbonyl terephthalate). The yield of the cyclopentadienyl manganese tricarbonyl-polyester copolymer was between 60 to 90 percent. The product has a Tg (onset) of between 40° to 60° C., and a molecular weight determined by GPC (Mw=10,000 to 25,000; Mn=3,000 to 7,000).

EXAMPLE IX

A cyclopentadienyl manganese tricarbonyl-containing polyester resin derived from 0.475 mole of dimethylterephthalate, 0.05 mole of 1,3-cyclopentadienyl manganese tricarbonyl dimethanol, and 0.425 mole of a 1,2-propanediol, and 0.075 mole of diethylene glycol was prepared as follows.

In a one liter Parr reactor equipped with a bottom drain valve, double turbine agitator, and distillation receiver with a cold water condenser were charged 388 grams of dimethylterephthalate, 266 grams of 1,2-propanediol (1 mole excess), 52.5 grams of diethylene glycol, 5.0 grams of 1,3-cyclopentadienyl manganese tricarbonyl dimethanol, and 0.8 gram of tetrabutyl titanate as the catalyst. The reactor was heated to 165° C. with stirring for 16 hours whereby 115 grams of distillate were collected in the distillation receiver comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced from atmospheric pressure to about 260 Torr over a one hour period, and then reduced to 5 Torr over a two hour period with collection of approximately 122 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer discharged through the bottom drain onto a container cooled with dry ice to yield 460 grams of a cyclopentadienyl manganese tricarbonyl-polyester resin, copoly(1,2-propyelene-diethylene) terephthalate-copoly(1,3-cyclopentadienylmanganese tricarbonyl terephthalate). The yield of the cyclopentadienyl manganese tricarbonyl-polyester copolymer was between 85 to 90 percent. The product had a Tg (onset) of between 40° to 60° C., and the molecular weight was determined by GPC (Mw=10,000 to 25,000; Mn=3,000 to 7,000).

EXAMPLE X

A benzene-iron tricarbonyl-containing polyester resin derived from 0.475 mole of dimethylterephthalate, 0.05 mole of 1,6-benzene(tricarbonyl) iron dimethanol, and 0.425 mole of a 1,2-propanediol, and 0.075 mole of diethylene glycol was prepared as follows.

In a one liter Parr reactor equipped with a bottom drain valve, double turbine agitator, and distillation receiver with a cold water condenser were charged 388 grams of dimethylterephthalate, 266 grams of 1,2-propanediol (1 mole excess), 52.5 grams of diethylene glycol, 5.0 grams of 1,6-benzene(tricarbonyl) iron dimethanol, and 0.8 gram of tetrabutyl titanate as the catalyst. The reactor was heated to 165° C. with stirring for 16 hours whereby 115 grams of distillate were collected in the distillation receiver comprised of about 98 percent by volume of methanol and 2 percent by volume of 1,2-propanediol as measured by the ABBE refractometer available from American Optical Corporation. The reaction mixture was then heated to 190° C. over a one hour period, after which the pressure was slowly reduced from atmospheric pressure to about 260 Torr over a one hour period, and then reduced to 5 Torr over a two hour period with collection of approximately 122 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer discharged through the bottom drain onto a container cooled with dry ice to yield 460 grams of a benzene(tricarbonyl) iron-polyester resin. The yield of the benzene(tricarbonyl) iron-polyester-polyester copolymer was between 85 to 90 percent. The product had a Tg (onset) of between 40° to 60° C., and a molecular weight determined by GPC (Mw=10,000 to 25,000; $M_n$=3,000 to 7,000).

EXAMPLE XI

A benzene-iron tricarbonyl-containing polyester resin derived from 0.475 mole of dimethylterephthalate, 0.05 mole of 1,6-benzene(tricarbonyl) iron dicarboxylate, and 0.425 mole of a 1,2-propanediol, and 0.075 mole of diethylene glycol was prepared as follows.

In a one liter Parr reactor equipped with a bottom drain valve, double turbine agitator, and distillation receiver with a cold water condenser were charged 388 grams of dimethylterephthalate, 266 grams of 1,2-propanediol (1 mole excess), 52.5 grams of diethylene glycol, 5.0 grams of 1,6-benzene(tricarbonyl) iron dicarboxylate, and 0.8 gram of tetrabutyl titanate as the catalyst. The reactor was heated to 165° C. with stirring for 16 hours whereby 115 grams of distillate were collected in the distillation receiver comprised of about 98 percent by volume of methanol and 2 percent by volume of 1,2-propanediol as measured by the ABBE refractometer available from American Optical Corporation. The reactor mixture was then heated to 190° C. over a one hour period, after which the pressure was slowly reduced from atmospheric pressure to about 260 Torr over a one hour period, and then reduced to 5 Torr over a two hour period with collection of approximately 122 grams of distillate in the distillation receiver comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer discharged through the bottom drain onto a container cooled with dry ice to yield 460 grams of a benzene(tricarbonyl) iron-polyester resin. The yield of the benzene(tricarbonyl) iron-polyester-polyester copolymer was between 85 to 90 percent. The product had a Tg (onset) of between 40 to 60° C, and a molecular weight was determined by GPC ($M_w$= 10,000 to 25,000; $M_n$=3,000 to 7,000).

EXAMPLE XII

A vinylferrocene-polystyrene-butadiene resin derived from 0.8 mole equivalent of styrene, 0.13 mole equivalent of butadiene, and 0.05 mole equivalent of vinylferrocene was prepared as follows.

A mixture of tricalcium phosphate (4.0 grams) suspended in a solution of alkanol (48 milliliters) in deionized water (40 milliliters) was added to a modified 300 milliliter Parr pressure reactor equipped with a double turbine agitator, and an externally cooled addition metal condenser containing 1,3-butadiene. The reactor was sealed and the contents were stirred at approximately 500 rpm while being heated to 95° C. over a period of 40 minutes. During this time, the reactor was flushed with nitrogen gas. At the end of the forty minutes, a solution of styrene (71.3 grams), 1,3-butadiene (10.7 grams), vinylferrocene (5.3 grams), benzoyl peroxide (2.20 grams) and TAEC, O,O-amyl-O-(2-ethyl hexyl)-monoperoxide carbonate (0.27 milliliter) was added to the reactor, via a sparge tube, under a pressure of nitrogen gas over a period of 14 to 16 minutes. The final reactor pressure was usually between 65 to 70 psi. The reaction was allowed to proceed at 95° C. for 160 minutes after 5 ventilation cycles with $N_2$ gas to remove unreacted butadiene. The reactor was then ramped up to 125° C. over a 40 minute period, maintained at that temperature for an additional 25 minutes, and then cooled to 25° C. The product was then stirred in the presence of nitric acid (8 milliliters) for 10 minutes, filtered, washed twice with 300 milliliters of deionized water, and dried under vacuum overnight at 40° C. The yield of the vinylferrocene-styrene-butadiene copolymer was between 85 to 90 percent. The product had a Tg (onset) of between 40° to 60° C, and a molecular weight was determined by GPC($M_w$=60,000 to 135,000; $M_n$=10,000 to 15,000).

EXAMPLE XIII

A cyclopentadienyl manganese tricarbonyl-polystyrenebutadiene resin derived from 0.8 mole equivalent of styrene, 0.13 mole equivalent of butadiene, and 0.05 mole equivalent of vinylcyclopentadienyl manganese tricarbonyl was prepared as follows.

A mixture of tricalcium phosphate (4.0 grams) suspended in a solution of alkanol (48 milliliters) in deionized water (40 milliliters) was added to a modified 300 milliliter Parr pressure reactor equipped with a double turbine agitator, and an externally cooled addition metal condenser containing 1,3-butadiene. The reactor was sealed and the contents were stirred at approximately 500 rpm while being heated to 95° C. over a period of 40 minutes. During this time, the reactor was flushed with nitrogen gas. At the end of the 40 minutes, a solution of styrene (71.3 grams), 1,3-butadiene (10.7 grams), vinylcyclopentadienyl manganese tricarbonyl (5.3 grams), benzoyl peroxide (2.20 grams) and TAEC, O,O-amyl-O-(2-ethyl hexyl)-monoperoxide carbonate (0.27 milliliter) was added to the reactor via a sparge tube under a pressure of nitrogen gas over a period of 14 to 16 minutes. The final reactor pressure is usually between 65 to 70 psi. The reaction was allowed to proceed at 95° C. for 160 minutes after 5 ventilation cycles with $N_2$ gas to remove unreacted butadiene. The reaction is then ramped up to 125° C. over a 40 minute period, maintained at that temperature for an additional 25 minutes, and then cooled. The product was then stirred in the presence of nitric acid (8 milliliters) for 10 minutes, filtered, washed twice with 300 milliliters of deionized water, and dried under vacuum overnight (about 18 hours throughout) at 40° C. The yield of the cyclopentadienyl manganese tricarbonyl-styrene-butadiene copolymer was between 85 to 90 percent. The product had a Tg (onset) of between 40° to 60° C., and a molecular weight was determined by GPC ($M_w$=60,000 to 135,000; $M_n$=10,000 to 15,000).

Toner compositions were prepared by mixing about 80.76 weight percent of each of the above prepared polymers with about 13 weight percent of REGAL 330®carbon black, 16 weight percent of the magnetite MAPICO BLACK®, and 0.24 weight percent of a mixture of charge enhancing additive of distearyl dimethyl ammonium methyl sulfate (DDAMS) and distearyl dimethyl ammonium bisulfate (DDABS), and thereafter, a developer was formulated by mixing 100 parts of carrier, reference the Xerox Corporation 5090 copy machine, comprised of a steel core, or iron core with a KYNAR®polyvinylidene fluoride coating thereover, 0.75 weight percent, with 4 parts of toner (TC equal 4 percent), and wherein the toner was of a volume average diameter of 6.2 microns, and had a GSD of 1.31. The toner tribo Q/M sensitivity ratio was an excellent 1.16 (20 percent RH/80 percent RH), that is the toner was substantially insensitive to RH (relative humidity), especially a toner with 0.15 mole percent of ferrocene polyester. Toners with the aforementioned polyester provided nearly an equal tribo charge at 20 percent RH, 12.2 and at 80 percent RH, 10.5 microcoulombs per gram as measured by the Farady Cage method; as compared to a toner with the same polyester resin with no ferrocene, wherein the 20 percent RH tribo was 19.5, the 80 percent RH tribo was 7.1 microcoulombs per gram, and the 20 percent RH/80 percent RH was 2.6. The polyester resin selected was obtained from dimethyl terephthalate, propanediol, and diethylene glycol.

Images developed with the above toner possessed excellent resolution, excellent line density, and superior density at 20 and 80 percent RH for 100,000 imaging cycles as compared to images with a toner containing the above polyester and no (zero percent) ferrocene wherein, for example, the image quality degraded.

Other modifications of the present invention may occur to those skilled in the art subsequent to a review of the present application, and these modifications, including equivalents thereof, are intended to be included within the scope of the present invention.

What is claimed is:

1. A toner composition comprised of a pigment, and a metallocene polymer, wherein said polymer is a metallocene containing polyester, a metallocene containing polyimide, a metallocene containing imide, a metallocene containing polyimide imine, a metallocene containing polyamic acid, a metallocene containing polystyrene, a metallocene containing polystyrene-acrylate, a metallocene containing polystyrene-methacrylate, or a metallocene containing a polystyrene butadiene.

2. A toner composition in accordance with claim 1 wherein the metallocene polymer is a metallocene polyester of the formulas

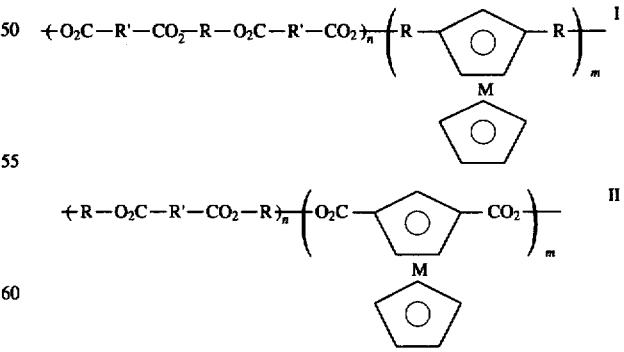

wherein R and R' are an alkylene or an arylene; M is the metal iron, cobalt, ruthenium, or osmium; and wherein n and m represent the random segments of the polymer, and wherein n is from about 10 to about 1,000, and m is from about 1 to about 100; and wherein said polymer possesses a number average molecular weight of from about 3,000 to about 50,000 grams per mole, a weight average molecular weight of from about 6,000 to about 150,000 grams per mole, and polydispersity of from about 2 to about 18.

3. A toner composition in accordance with claim 1 wherein the metallocene polymer is a metallocene polyester of the formulas

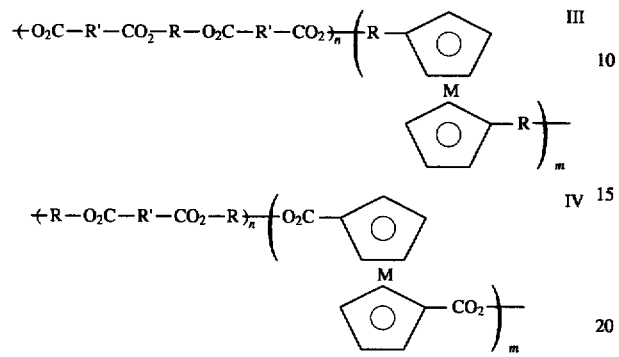

wherein R and R' are an alkylene or arylene; M is the metal iron, cobalt, or ruthenium; and wherein n and m represent the random segments of the polymer, and wherein n is from about 10 to 1,000, and m is from about 1 to 100; and wherein said polymer possesses a number average molecular weight of from about 3,000 to about 50,000 grams per mole, a weight average molecular weight of from about 6,000 to about 150,000 grams per mole, and polydispersity of from about 1.5 to about 18.

4. A toner composition in accordance with claim 1 wherein the metallocene polymer is a metallocene polyester of the formula

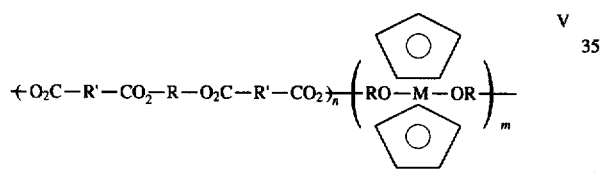

wherein R and R' are an alkylene or an arylene; M is the metal titanium; and wherein n and m represent the random segments of the polymer, and n is a number of from about 10 to about 1,000, and m is from about 1 to about 100.

5. A toner composition in accordance with claim 1 wherein the metallocene polymer is a metal containing polyester of the formulas

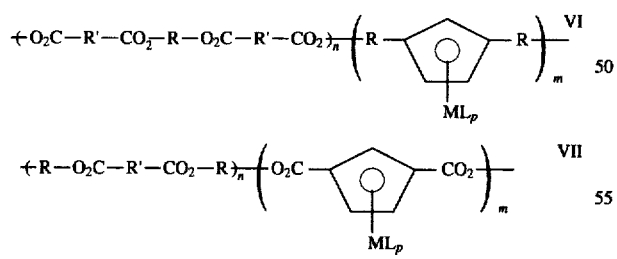

wherein R and R' are an alkylene of from about 2 to about 30 carbon atoms or arylene of from about 6 to about 30 carbon atoms; M is the metal dicarbonylcobalt, rhodium, tungsten, iridium, or copper; L is the ligand carbonyl, nitroxide, trialkylamine or trialkylphosphine; and p is an integer of 2, 3 or 4; and wherein n and m represent random segments, and n is a number of from about 10 to about 1,000, and m is from about 1 to about 100.

6. A toner composition in accordance with claim 2 wherein the metallocene polymer is a metal containing polyester of the formulas

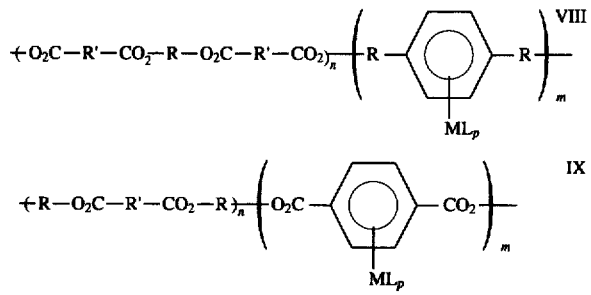

wherein R and R' are an alkylene or arylene; M is the metal dicarbonylcobalt, rhodium, tungsten, iridium, or copper; L is a ligand of carbonyl, nitroxide, trialkylamine or trialkylphosphine; and p is an integer of 2, 3 or 4; and wherein n and m represent random segments, and n is from about 10 to about 1,000, and m is from about 1 to about 100.

7. A toner composition in accordance with claim 1 wherein the metallocene is the metal iron, copper, osmium, ruthenium, copper, iridium, cobalt, titanium, or rhodium.

8. A toner composition in accordance with claim 1 wherein the metallocene containing polymer possesses a number average molecular weight of from about 1,500 to about 150,000, a weight average molecular weight of from about 3,000 to about 300,000, and a polydispersity of from about 1.0 to about 15; and wherein the metallocene polymer is selected from the group consisting of polyester, polyimide, polystyrene-butadiene, and polystyrene-methacrylate.

9. A toner composition in accordance with claim 1 which possesses a low fixing temperature of from about 120° C. to about 145° C., and a broad fusing latitude of from about 40° C. to about 120° C.

10. A toner composition in accordance with claim 1 with a relative humidity sensitivity of from about 1.01 to about 2.9.

11. A toner composition in accordance with claim 1 further including a charge enhancing additive, or mixtures thereof incorporated into the toner, or present on the surface of the toner.

12. A toner composition in accordance with claim 1 further containing a wax component with a weight average molecular weight of from about 1,000 to about 10,000.

13. A toner composition in accordance with claim 1 further containing as external additives metal salts of a fatty acid, colloidal silicas, or mixtures thereof.

14. A toner composition in accordance with claim 1 wherein the pigment is carbon black, magnetites, or mixtures thereof, cyan, magenta, yellow, red, blue, green, brown, or mixtures thereof.

15. A toner composition in accordance with claim 1 wherein the pigment is carbon black.

16. A toner composition in accordance with claim 1 wherein the metallocene is present in an amount of from about 0.25 to about 10 mole percent of the resin.

17. A developer composition comprised of the toner composition of claim 1, and carrier particles.

18. A developer composition in accordance with claim 17 wherein the carrier particles are comprised of ferrites, steel, or an iron powder with an optional coating, or mixture of coatings.

19. A method of imaging which comprises formulating an electrostatic latent image on a photoconductive imaging member, affecting development thereof with the toner composition of claim 1, and thereafter transferring the developed image to a suitable substrate.

20. A toner composition in accordance with claim 1 wherein the metallocene polymer is the ferrocene containing polyester selected from the group consisting of copoly(propylene-diethylene-terephthalate)copoly (1,1'-dicarboxyl-ferrocene), copoly(diethylene-terephthalate)-copoly(copoly(1,1') -dicarboxyl-ferrocene), copoly(propylene-terephthalate)-copoly(1,1'-dicarboxyl -ferrocene), copoly(neopentylene-terephthalate)-copoly(1,1'-dicarboxyl-ferrocene), copoly(neopentylene-diethyleneterephthalate) -copoly(1,1'-dicarboxyl-ferrocene), copoly(neopentylene-propyleneterephthalate)-copoly(1,1'-dicarboxyl-ferrocene), and a copoly(propylene-diethylene-terephthalate-5-sulfoisophthalate sodium salt)-copoly(1,1'-dicarboxyl-ferrocene).

21. A toner composition in accordance with claim 1 wherein the metallocene polymer is selected from the group consisting of the cobalt acenium containing polyester copoly(propylene-diethylene-terephthalate)copoly (1,1'-dicarboxyl-cobalt acenium), copoly(diethylene-terephthalate)-copoly(1,1'-dicarboxyl-cobalt acenium), or copoly(propylene-tetephthalate) -copoly(1,1'-dicarboxyl-cobalt acenium); the ruthenocene containing polyester copoly(propylene-diethylene-terephthalate)copoly(1,1'-dicarboxyl-ruthenocene), copoly(diethylene-terephthalate)copoly(1,1'-dicarboxyl-ruthenocene), or copoly(propylene-terephthalate)copoly(1,1'-dicarboxyl-ruthenocene); and the osmocene polyester copoly(propylene-diethylene-terephthalate)-copoly(1,1'-dicarboxylosmocene), copoly(diethylene-terephthalate)-copoly(1,1'-dicarboxylosmocene), or copoly(propylene-terephthalate)-copoly(1,1'-dicarboxylosmocene).

22. A toner composition in accordance with claim 1 wherein the metallocene polymer is copoly(styrene-butadiene)-copoly(vinylferrocene), copoly(styrene-acrylate)-copoly(vinylferrocene), copoly(styrene-methacrylate) -copoly(vinylferrocene), copoly(styrene-isoprene)copoly(vinylferrocene), polyvinylruthenocene, copoly(styrene-butadiene)-copoly(vinylruthenocene), copoly(styrene-acrylate )copoly(vinylruthenocene), copoly(styrene-methacrylate)copoly(vinylruthenocene), polyvinyl-(cobalt acenium), copoly(styrene-butadiene) -copoly(vinylcobalt acenium), copoly(styrene-acrylate)-copoly(vinylcobalt acenium), or copoly(styrene-methacrylate)-copoly(vinylcobalt acenium).

23. A toner composition in accordance with claim 2 wherein alkylene is ethylene, propylene, butylene, pentylene, hexylene, heptylene, octylene, nonylene, decylene, dodecylene, stearylene, laurylene, and arylene is phenylene, biphenylene, cyclohexylene, or anthrylene.

24. A toner composition in accordance with claim 3 wherein the valency p is 1, 2, 3, or 4.

25. A toner composition in accordance with claim 3 wherein the valency p is 3.

26. A toner composition in accordance with claim 5 wherein L is the trialkylamine triethylamine, tripropylamine, tributylamine, tripentylamine trihexylamine, or the trialkylphosphine triethylphosphine, tripropylphosphine, tributylphosphine, tripentylphosphine, or trihexylphosphine.

27. A toner composition in accordance with claim 1 wherein said polymer is the ferrocene polyester copoly(1,2-propylene-diethylene) terephthalate.

28. A toner composition in accordance with claim 1 wherein said polymer is the ferrocene polyester copoly(1,2-propylene-diethylene) terephthalate-copoly(1,1'-ferrocene dicarboxylate).

* * * * *